United States Patent [19]
Szkaradek

[11] 3,984,055
[45] Oct. 5, 1976

[54] SANDMILL CONTROL SYSTEM

[75] Inventor: Edward J. Szkaradek, Santa Ana, Calif.

[73] Assignee: Morehouse Industries, Inc., Fullerton, Calif.

[22] Filed: July 18, 1975

[21] Appl. No.: 597,144

Related U.S. Application Data

[63] Continuation-in-part of Ser. No. 529,409, Dec. 4, 1974, Pat. No. 3,960,331.

[52] U.S. Cl. .................................................. 241/36
[51] Int. Cl.² ........................................... B02C 25/00
[58] Field of Search .......... 241/33, 36, 46.11, 46.17

[56] References Cited
UNITED STATES PATENTS

| | | | |
|---|---|---|---|
| 1,808,914 | 6/1931 | Bennett | 241/36 |
| 1,813,086 | 7/1931 | Sahmel | 241/33 |
| 3,502,276 | 3/1970 | Panning et al. | 241/36 |
| 3,844,490 | 10/1974 | Schold et al. | 241/171 |
| 3,905,557 | 9/1975 | Grommes et al. | 241/36 |

*Primary Examiner*—Granville Y. Custer, Jr.
*Attorney, Agent, or Firm*—Knobbe, Martens, Olson, Hubbard & Bear

[57] ABSTRACT

High pressure sandmill operation is obtained by balancing the pressure within the vessel on one side of a rotor shaft seal with a higher pressure on the other side of the seal. Pressure switches are employed to sense the pressure within the vessel, the seal housing, and the cooling water jacket surrounding the vessel. The switches are connected in electrical control circuits to deenergize the product pump whenever the sensed pressures are beyond predetermined acceptable ranges. The control circuits also energize lights which indicate which pressure was out of its range and energize a light indicating that the pump motor is deenergized. The control circuit further includes means responsive to the temperature of the product being pumped to the vessel so that an audible warning signal is generated if the temperature exceeds a predetermined level.

12 Claims, 4 Drawing Figures

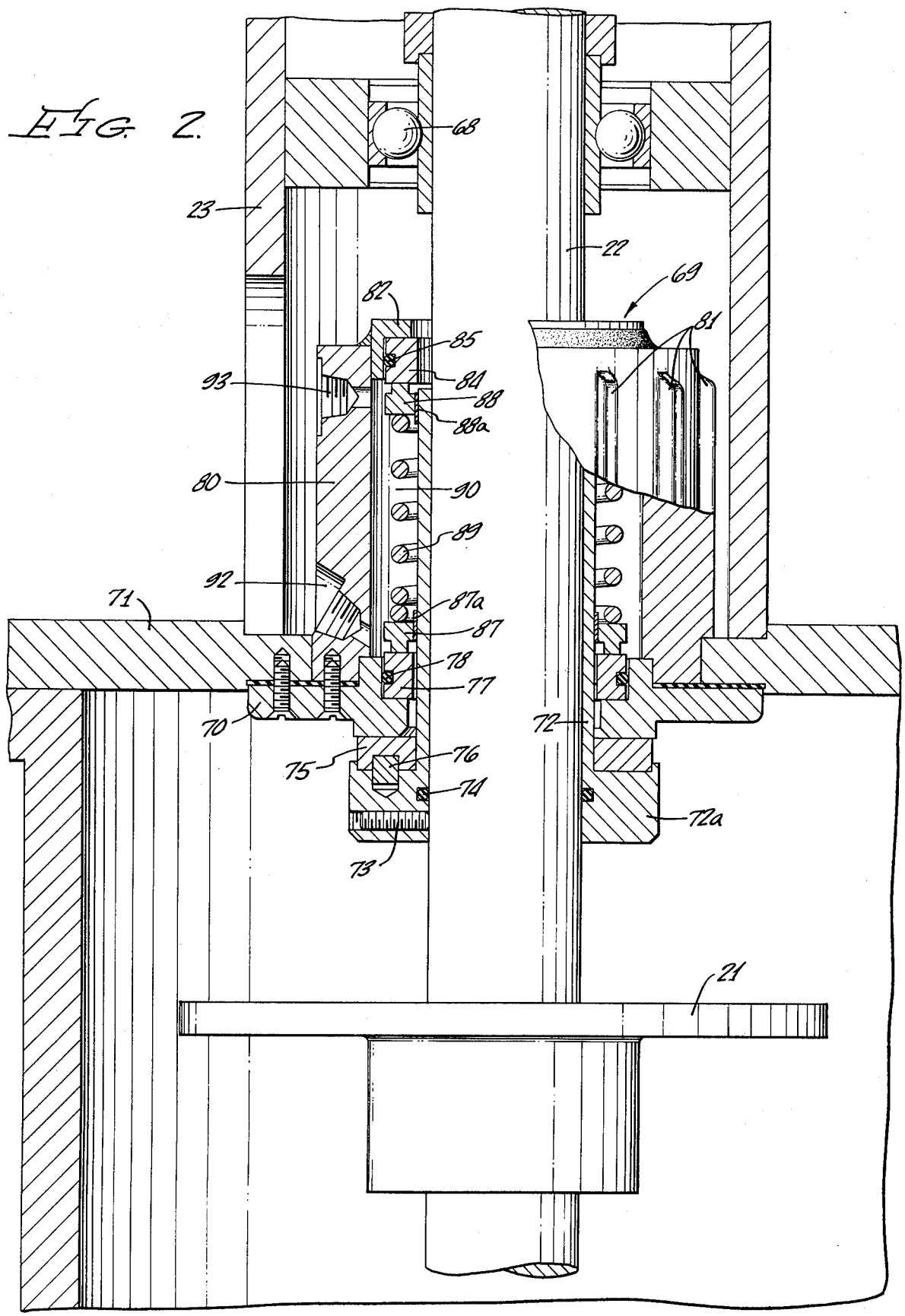

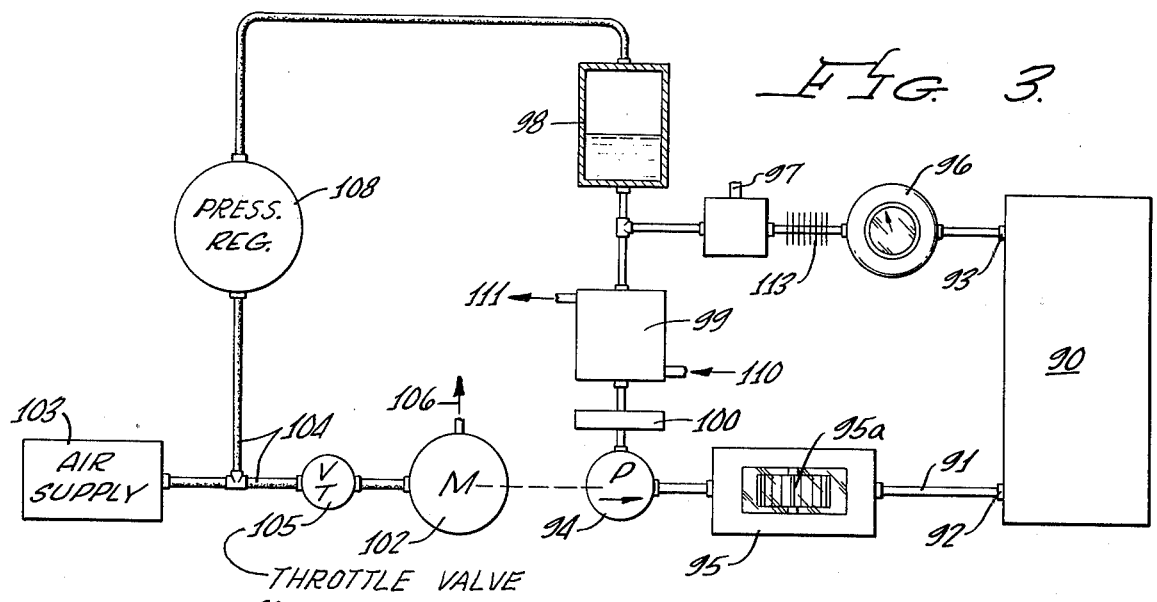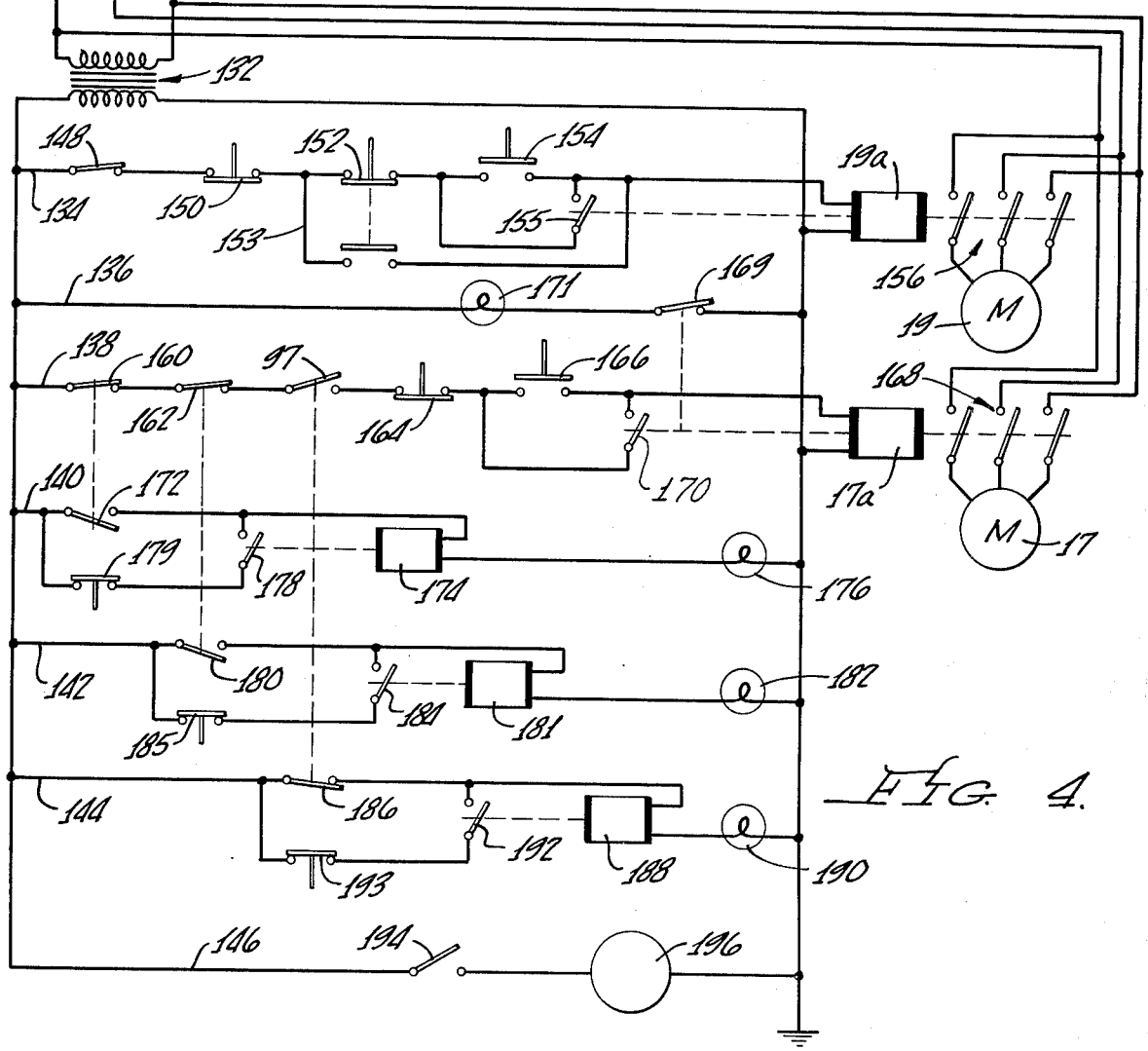

SANDMILL CONTROL SYSTEM

This invention is a continuation-in-part of U.S. patent application, Ser. No. 529,409, filed Dec. 4, 1974, now U.S. Pat. No. 3,960,331, issued June 1, 1976.

The invention relates to mixing or grinding apparatus such as sandmills which mill or grind to a high degree of fineness particles within liquids. More specifically, the invention relates to an improved control system for such apparatus in the event of malfunction during operation.

Sandmilling is a proven, practical, continuous, high production method of dispersing or grinding particles in liquids to produce smooth, uniform, finely dispersed products. One good example of this is the grinding of pigment agglomerates in paint. The process is applicable to a wide variety of materials where milling to obtain a smooth, thoroughly mixed output is required.

In the typical sandmilling operation, the material or slurry to be processed is introduced at the bottom of the chamber within a milling vessel and then pumped upwardly through a grinding media and out the upper end of the vessel. The grinding media is often referred to as sand although it is frequently a small diameter manufactured grit or shot, rather than sand. Rotors positioned within the vessel forming the processing chamber grind the slurry as it is pumped through the media.

The pressure required to pump the slurry through the vessel is not great for low viscosity materials, but high viscosity materials require pressures up to 50PSI in the sandmill vessel. Pressures at this level require a balancing pressure on the external side of the seal in the area where the rotor shaft extends out of the vessel. Thus, a closed chamber is formed around the external side of the seal and pressure is maintained in that chamber to balance the pressure within the vessel. It is important to monitor this seal pressure in that leakage may occur if the pressure is too low, and more importantly, the seal components may be damaged because of the possibility of grinding media being forced out through the seal.

It is also important to monitor the product temperature and pressure within the vessel. Further, it is desirable to make sure that the cooling water pressure in the cooling jacket surrounding the vessel is in a predetermined range.

When an abnormal pressure condition occurs, it is desirable to stop the product pump until the malfunction is corrected. With a variety of pressure conditions being sensed, and hence, a variety of possible malfunctions for stopping the pump, it would be helpful to maintenance personnel to know which condition had caused the stoppage. More fundamentally yet, the operator or maintenance personnel should first know that the pump has indeed stopped. Because apparatus of this type is often utilized in a noisy environment with other industrial apparatus in operation and because the sandmilling apparatus is not attended on a continual basis, it is quite possible that a particular machine may have its pump shut off for a considerable time before an operator becomes aware of the problem.

Accordingly, a need exists for providing suitable signals indicating when a malfunction occurs and indicating the nature of the malfunction. In accordance with the present invention, means are provided for sensing a variety of pressure parameters of the sandmill operation and these sensing means are connected to stop the motor driving the pump whenever any of the sensed parameters are beyond a predetermined range. A warning or indicating means, such as a light or a device providing an audible signal, is connected to be energized when any of the sensed parameters are beyond their range.

In a preferred embodiment of the invention, the pressure switches responsive to product pressure, cooling water pressure and seal pressure are connected to energize lights when the pressures are beyond a specified range. These lights identify which parameter was beyond range. If desired, these lights may be latched in an energized position so that an indication will be given as to the cause of the stoppage even though the condition may no longer exist when the operator arrives. The light may be manually deenergized. In addition to the lights indicating the particular malfunction, the control circuit may include a separate light which merely indicates that the pump motor is off.

It is often particularly important that the temperature of the product being processed must not exceed a given level, in that, the product may be damaged. Thus, as another feature of the invention, a temperature responsive audible signaling device is included in the control circuit. Thus, an operator in the area will be warned even though he is in a location of the building where he cannot see the apparatus. In the over-temperature condition, it is preferable to have the product pump continue in that interrupting the incoming flow of cool product might aggravate the situation.

For a more thorough understanding of the advantages and operation of the invention, refer to the following detailed description and drawings, in which:

FIG. 2 is an elevational, partially sectionalized view of the upper portion of the sandmill vessel showing the seal assembly for the rotor shaft;

FIG. 3 is a schematic illustration of the coolant-lubricant system for the high pressure seal of FIG. 2; and FIG. 4 is a schematic illustration of the sandmill electrical control system of the invention.

Figure 1:
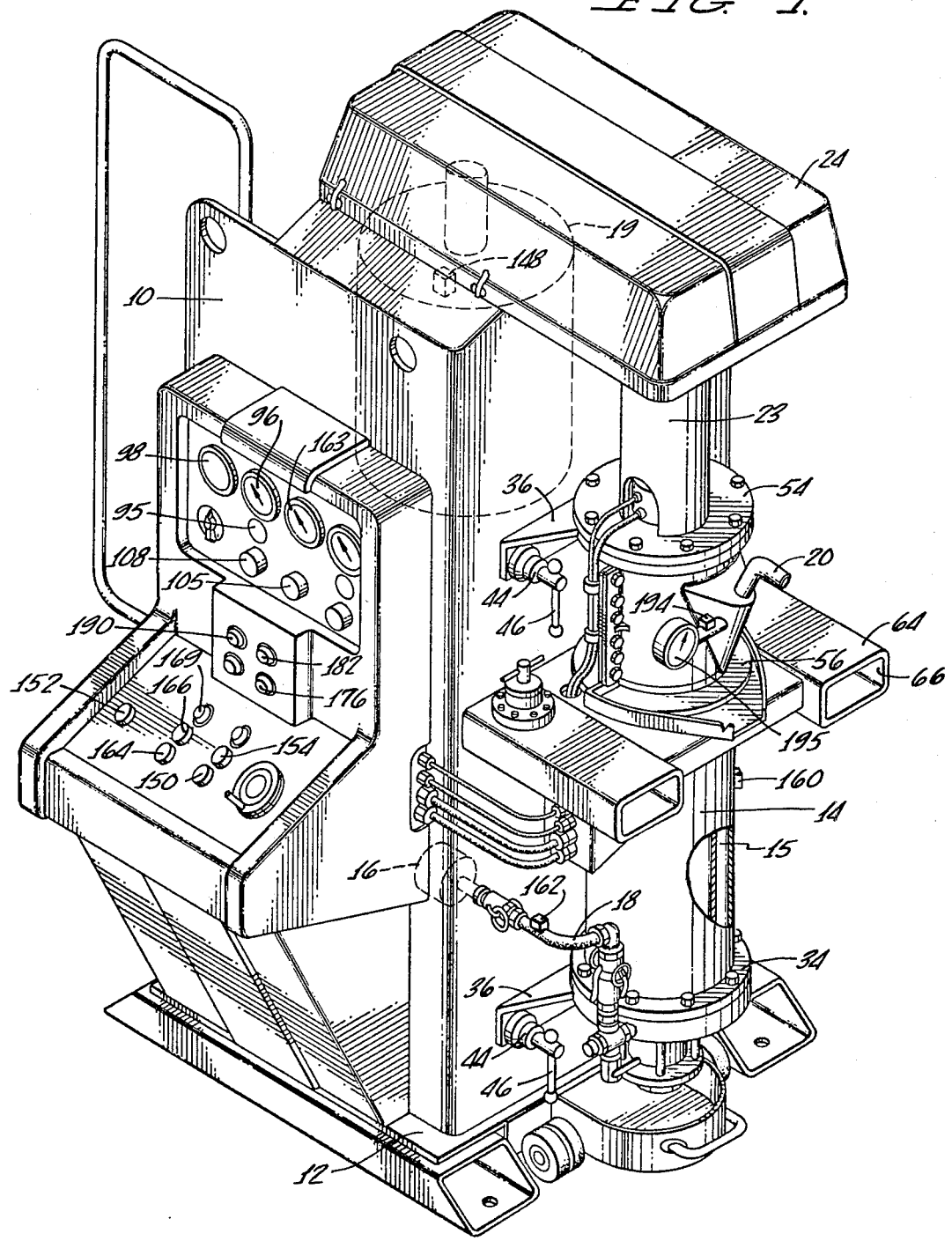
FIG. 1 is a perspective view of a sandmill of the type which can utilize the control system of the invention.

Referring first to FIG. 1, the sandmill apparatus shown includes a support column or pedestal 10 mounted on a platform or base 12. The column has a rectangular cross-section and is made of heavy metal plate to support the weight of a cylindrical vessel 14 vertically oriented and mounted on the support column 10. The vessel has spaced double walls which form a cooling chamber 15 for the circulation of water or other suitable coolant (through lines not shown) which maintains the vessel in an acceptable temperature range. A pressure switch schematically indicated at 160 senses the pressure within the water jacket.

Within the vessel there are a plurality of rotors 21 mounted on a shaft 22 which extends out the upper end of the vessel through a tubular bearing housing 23 and into a transmission housing 24 pivotally mounted on the upper end of the support column 10. The rotor shaft is driven by a pulley and drive belt arrangement (not shown) within the transmission housing 24, that are in trun driven by an electric motor 19 in the upper portion of the column 10. A limit switch 148 senses whether the housing is open or closed.

The liquid or slurry to be processed through the vessel 14 is moved by a pump 16 supported on a column 10 on the base 12 and driven by a motor 17 positioned within the column. The output from the pump 16 is ducted by a hose 18 to an inlet in the lower end of the vessel 14 and pumped upwardly through the vessel and out a pipe 20 in the upper end of the vessel. The pressure of the product within the vessel is sensed by a suitable pressure switch 162 and gauge 163 schematically shown in FIG. 1. Preferably, the pressure applied to the switch 162 and the gauge 163 is transmitted through a membrane and a suitable medium to separate these elements from the grinding media in the vessel. The temperature of the product is also sensed by a suitable temperature responsive switch 194 and a gauge 195 both of which are shown schematically in FIG. 1.

The vessel 14 is supported on the column in a manner to be readily removable. Lugs 36 are attached to an annular flange 34 at the lower end of the vessel and to a flange 54 in the upper end of the vessel. Each lug includes a downwardly facing V-shaped notch or recess (not shown) which fits over a post 44 extending horizontally from the support column 10. Retaining members 46 on the post clamp the lugs against the support column. If a vessel is to be removed, the retaining members are loosened, the drive means within the transmission housing is disconnected from the upper end of the rotor shaft, various fluid connections through the sandmill are disconnected by means of quick disconnect couplings, and the vessel is simply lifted and moved away by a forklift truck. The tines of the truck are inserted within the slot 66 formed in the member 64 attached to the flange 56 near the midportion of the vessel. The removable features of the sandmill are described in greater detail and claimed in a copending U.S. patent application, Ser. No. 573,549, filed May 1, 1975 and assigned to the same assignee as the present invention.

Referring now to FIG. 2, the rotor shaft 22 is mounted for rotation in roller bearing 68 supported in the bearing housing 23. A second roller bearing (not shown) located where the bearing housing 23 joins the transmission housing 24 provides further rotational support and also provides thrust support for the shaft 22. Positioned below the bearing 68 at the location where the shaft 22 passes through the upper end of the vessel 14 is a seal assembly 69 mounted on a seal ring plate 70 attached to the upper end 7 of the vessel 14. A long sleeve 72 snugly surrounds the shaft 22 and is secured to rotate with the shaft by means of a set screw 73. A flange 72a on the lower end of the sleeve 72 is positioned in the vessel 14 with the other portion extending out of the vessel through the plate 70. A suitable fixed seal 74 extends between the sleeve and the shaft to prevent leakage along the shaft. A barrier ring 75 made of teflon or other such material is attached by a pin 76 or other suitable means to the upper surface of the flange 72a on the lower end of the sleeve 72. The barrier ring slidably engages the lower surface of the seal plate 70 when the shaft 22 rotates. Within an inner upper shoulder of the plate 70 is a stator ring 77 having an O-ring 78 positioned in a groove in the outer wall of the ring to prevent leakage between the ring 77 and the plate 70. The inner wall of the ring 77 has a slight clearance between it and the sleeve 72 which extends upwardly through the ring 77 and the plate 70. The ring 77 is made of a very hard material, such as tungsten carbide, and its upper surface is highly polished.

Attached to the upper side of the plate 70 is an annular sealed housing 80 having attached at its upper end a cover ring 82 having an L-shaped cross-section. Within the cover ring 82 is positioned a stator ring 84 similar to the lower stator ring 77 and having an O-ring positioned in its outer surface in sealing engagement with the cover ring 82.

Extending between the stator rings 77 and 84 is a sealing unit including a lower sealing ring 87 and an upper sealing ring 88, both of which are urged by suitable spring means 89 into engagement with the stator rings 77 and 84. The sealing rings 87 and 88 are preferably made of carbon or other such material which can form a high pressure sliding seal. Each of the rings 87 and 88 are snugly mounted on the sleeve 72 by means of elastomer members 87a and 88a formed on the inner wall of the sealing rings.

As can be seen from the drawings, the seal housing 80 is spaced from the shaft 22 and the seal rings 87 and 88 so that an annular chamber 90 is formed. A liquid which serves as a coolant, a lubricant and a pressure medium is utilized to fill the chamber 90. The liquid selected should be compatible with the material to be milled in the vessel in the event of leakage into the vessel. Mineral oil is suitable for use as such a coolant-lubricant with many paints that may be milled.

In operation of the sandmill, the coolant-lubricant is placed under pressure to balance the pressure that exists within the sandmill vessel. As explained above, it is desirable that many materials be processed through the sandmill under a relatively high pressure such as about 50PSI. The materials having a high viscosity are the primary ones wherein it is desirable to have a high pressure operation. Because the grinding media used in the vessel is very abrasive, a difficult sealing problem is created with high pressure operation. That is, the abrasive material under high pressure tends to wear away a sealing element. By applying a balancing pressure on the opposite side of the seal, this problem is minimized. Thus, a pressure about 20PSI greater than the pressure in the vessel is applied to the chamber 90.

When the sandmill is in operation with, say 40 to 50PSI pressure in its interior and with the grinding media being agitated by the rotation of the rotor shaft 22, the barrier ring 75 provides a sliding seal with the lower surface of the plate 70. This seal does not prevent fluid leakage but it does present a barrier to the media. This prevents the media from interfering with the sliding seal between the stator 77 and the sealing ring 87. Since the teflon ring 75 does not provide a complete fluid seal, the pressure of the vessel is also applied to the stator ring 77. However, the O-ring 78 prevents leakage between the ring 77 and the plate 70. The sliding interface between the stator ring 77 and the sealing ring 87 is also subjected to the interior vessel pressure. The static seal between the elastomer 87a and the adjacent sleeve surface prevents leakage along the sleeve. The spring loaded sealing ring 87 prevents leakage between the ring 87 and the stator ring 77. As mentioned, the coolant-lubricant within the chamber 90 is subjected to a higher pressure than the vessel. Consequently, there is no concern for the material in the vessel leaking outwardly past the seal. The chamber pressure also assists the seal by urging the sliding ring 87 into engagement with the stator ring 77. Even if some slight leakage should occur into the vessel, this is normally no problem since the coolant-lubricant selected is compatible with the material being processed through the vessel. The sealing ring 88 operates like the sealing ring 87 to prevent leakage of the coolant-lubricant from the upper end of the chamber 90. The elastomer members continue to prevent leakage between the shaft and sealing rings 87 and 88, even with slight axial shifting of the rings 87 and 88 as they wear.

In operation of the sandmill, it has been found that the temperature in the area of the balanced pressure seal can get to undesirable levels with simply a high pressure seal chamber and little or no cooling capability. While the seal can handle a fairly high temperature, the life of the seal components is enhanced by keeping a relatively low temperature. Accordingly, it is desirable that the coolant-lubricant be maintained at a relatively low temperature. The present invention provides a system for accomplishing this.

Referring to FIG. 3, as well as FIGS. 1 and 2, a fluid flow line 91 is connected to an inlet 92 in the lower end of the seal housing 80 and to an outlet 93 in the upper end of the seal housing. Serially included in the line is a pump 94, a flow indicator 95, a pressure gauge 96, an electrical pressure switch 97, a sight gauge 98, a heat exchanger 99 and a filter 100. Some of these components are schematically shown mounted on the apparatus in FIG. 1, but it should be understood that they can be mounted where convenient and readily accessible.

The pump 94 is driven by an air motor 102 positioned in an air line 104, which is fed by shop air or some other suitable source 103. A throttle valve 105 controls the quantity of air to the motor 102. After passing through the motor, the air exits through a suitable exhaust 106.

Also in the air line 104 is an air pressure regulator 108 which controls the air pressure applied to the sight gauge 98, against the coolant-lubricant seen in the lower end of the sight gauge.

When the sandmill is to be placed into operation, starting rotation of the rotors and pumping of the product slurry through the vessel, the coolant-lubricant circulating system is first initiated. The air pressure from the supply 103 is applied to the line 104 to the motor 102 which drives the coolant-lubricant pump 94. The speed of the pump and hence the circulation rate provided by the pump is controlled by the throttle valve 105 which controls the amount of air supplied to the motor 102. The pump 94 circulates the coolant-lubricant through the line 91 and into and out of the sealed chamber 90 by way of the inlet 92 and the outlet 93. The pressure regulator valve 108 connected to the air supply 103 provides a predetermined constant pressure to the sight gauge 98 applying the pressure to the coolant-lubricant line 91. Preferably the pressure applied is about 20PSI above the product pressure in the vessel 14.

The interface between the air and the coolant-lubricant is made in the form of a sight gauge so that the operator of the apparatus can see that there is sufficient coolant-lubricant in the line 91. The rotating element 95a in the flow indicator 95 enables the operator to easily see whether the coolant-lubricant is being circulated.

The rotating carbon sealing rings 87 and 88 shown in FIG. 2 gradually wear away in use. The filter 100 in the coolant-lubricant line continually purifies the coolant-lubricant so that the small carbon particles do not clog the components or act as an abrasive in the system. The flow indicator 95 enables the operator to monitor the visual appearance of the coolant-lubricant also.

The pressure gauge 96 allows the operator to easily visually check to see whether adequate pressure is being maintained. Further, if the operator is not present or not sufficiently observant, the electrical pressure switch 97 will provide an electrical signal to be described below.

As mentioned above, the coolant-lubricant if confined within the chamber 90, tends to become undersirably warm. Simply by circulating the coolant-lubricant through the line 91, its temperature is reduced considerably. In addition to that, however, the heat exchanger 99 having a cooling water inlet 110 and a water outlet 111 maintains the coolant at a desired temperature. To further enhance the cooling capacity of the system, the conduit forming the coolant-lubricant line 91 may be provided with external cooling fins, schematically illustrated at 113 in FIG. 3. Similarly, the exterior of the seal chamber 80 is provided with a plurality of external cooling fins 81 as may be seen in FIG. 2.

Referring to the electrical control circuit of FIG. 4, there is shown a three phase high voltage electrical supply indicated at 130 on the drawing. The electrical supply is connected to the pump motor 17 and the rotor motor 19. The high voltage power supply 130 is reduced to 115 volts by a conventional transformer 132. Connected in parallel to the low voltage side of the transformer 132 are a start-stop circuit 134 for the rotor motor 19, a warning circuit 136 for the pump motor 17, a start-stop circuit 138 for the pump motor 17, pressure responsive warning circuits 140, 142 and 144 for the coolant water, the product being processed and the rotor seal, respectively, and a temperature responsive warning circuit 146.

Connected in series in the start-stop circuit 134 for the rotor motor are the transmission housing limit switch 148, a stop switch 150, a jog switch 152, a start switch 154 and a relay coil 19a for the rotor motor 19. The limit switch 148 remains closed unless the transmission housing 24 shown in FIG. 1 is opened. This prevents the operator and maintenance personnel from working on the transmission when the motor is energized. Occasionally, it is desirable to momentarily start or jog the rotor motor. Depressing the jog switch 152 accomplishes this in that the switch will immediately open once the switch is no longer held closed. When the jogging switch 152 is depressed, a parallel current path through conductor 153 bypasses the regular start switch 154 which is normally open as shown.

When the motor is to be permanently started, it is only necessary to depress the start switch 154 to energize the coil 19a. This in turn closes the normally open contacts 156 controlling the application of high voltage power to the motor 19. The motor coil 19a also closes the relay contacts 155 which are connected in parallel around the start switch 154. Thus, the circuit remains energized even though the start switch is released. Naturally, depressing the stop switch deenergizes the coil 19a so that the start switch relay contacts 155 and the motor relay contacts 156 will immediately open.

The stop-start circuit 138 for the pump motor 17 includes the following elements serially connected: the normally closed switch 160 responsive to the pressure of the water in the cooling jacket; a normally closed switch 162 responsive to the product pressure within the vessel; a normally open switch 97 responsive to the pressure in the coolant-lubricant system for the shaft seal; a stop switch 164; a start switch 166; and a coil 17a for the pump motor 17. The coil 17a when energized will close the motor relay contacts 168 and the relay contacts 170 which are connected in parallel to the start switch 166. The coil 17a will also open the contacts 169.

Included in the circuit 140 is a switch 172 which is opened when the water pressure switch 160 is closed, and closed when the switch 160 is opened. The switch contacts 172 are serially connected to a latching relay coil 174 and a suitable light 176. The latching coil 174 operates normally open relay contacts 178 which are connected in parallel with the switch contacts 172. A normally closed reset switch 179 is connected in series with the contacts 178.

Included in the product pressure warning circuit 142 are the normally open switch contacts 180 that move with the product pressure switch 162. A relay coil 181 and a light 182 are connected in series with the normally open switch 180. The coil 181 controls the normally open relay contacts 184 which are connected in parallel with the switch 180. The normally closed reset switch 185 is connected in series with the relay contacts 184.

The seal pressure warning circuit 144 includes a normally closed switch 186 which operates in conjunction with the seal pressure switch 97. A relay coil 188 is connected in series with the switch 186 and with a light 190. The relay coil controls the normally open switch contacts 192 in parallel with the switch 186. A reset switch 193 is connected in series with the relay switch 192.

In operation of the sandmill, if power is first supplied from the high voltage source 130, the light 171 is energized because the relay contacts 169 are normally closed. This light is visible on the exterior of the sandmill at some suitable location and indicates to the operator that the pump motor 17 is not energized.

The light 190 would also be energized since the switch 186 is normally closed. This light 190, also suitably located on the exterior of the sandmill, tells the operator that there is insufficient pressure applied to the seal chamber 90 shown in FIG. 2. The pressure switch 97 in FIGS. 3 and 4 senses an underpressure condition and thus is in its normally open position as shown in FIG. 4. Consequently, the pump motor cannot be started. Thus, the first step to start operation once power has been applied to the system is to apply air pressure from the air supply 103 shown in FIG. 3. This places the coolant-lubricant in the line 91 under pressure as determined by the pressure regulator 108. Upon application of such pressure to the seal chamber, the pressure switch 97 is moved to a closed position and its corresponding switch 186 is moved to an open position. Upon opening the reset switch 193, the light 190 is deenergized indicating that there is sufficient pressure applied to the seal chamber 90.

To start the rotor motor 19, it is only necessary to depress the start switch 154 which will energize the motor coil 19a. This in turn closes the motor relay contacts 156 to commence operation of the motor and simultaneously closes the relay switch 155 so that the start switch 154 may be released. The foregoing, of course, assumes that the transmission housing 24 is closed so that the limit switch 148 is closed.

To start operation of the pump motor 17, the start switch 166 is closed. This energizes the motor coil 17a which closes the normally open relay motor contacts 168, thus applying power to the motor 17. The coil 17a also closes the relay contacts 170 parallel to the start switch 166 so that the start switch can be released. Additionally, the motor coil 17a opens the relay switch 169, thus deenergizing the light 171.

The sandmill is now in operation and will continue so unless either of the motor stop switches 150 and 164 are actuated or unless one of the operating pressure parameters which are being sensed get beyond their predetermined range. The water jacket pressure switch 160 senses an overpressure water condition. Normally the cooling water is under normal city water pressure in the range of, say 50 to 90PSI. If for some reason the pressure should be abnormally high which might cause leakage in the area of the water jacket, the pressure switch 160 would open causing three things to occur. The pump motor 17 would stop, the switch 169 would close, energizing the light 171 indicating that the pump motor had stopped. The switch 172, which moves in unison with the pressure switch 160, would close, energizing the light 176 which indicates that the water pressure is too high. The switch 178 would also close, thus insuring that the light 176 would remain on even though the water pressure dropped. Thus, when the operator or a maintenance man appears, he immediately knows from the lights 171 and 176 that the pump motor is not running and that the water pressure was too high. If the water pressure has since dropped or the malfunction has been corrected, the pump motor 17 can be once more started by depressing the start button. Actuating the reset switch 179 will deenergize the light 176. If desired, the pressure switch 160 could be installed to measure underpressure instead of overpressure similar to the seal pressure switch 97. Or, alternatively, the underpressure switch could be added and the overpressure switch kept in the system.

If the product pressure within the vessel 14 exceeds a predetermined pressure, the pressure switch 162 will open deenergizing the pump motor 17 and energizing the light 171. Simultaneously, the switch 180 will close energizing the product warning light 182. Upon deenergization of the pump motor 17, the pressure will immediately drop in the vessel so that the pressure responsive switch 162 will once more close and the normally open switch 180 will open. However, the light 182 will remain energized because the coil 181 has closed the switch 184. Thus, the operator will know that the product temperature had been too high. Also the pump motor 17 will remain unenergized until the start switch is once more depressed. The system could be immediately energized, but, of course, if the problem which caused the pressure rise has not been corrected, the overpressure switch 162 would immediately shut the motor off again.

As has been previously indicated, the seal pressure switch 97 had to be closed before the pump motor 17 was first started. If the pressure should drop below a specified or predetermined level, the pressure switch 97 will once more open, deenergizing the motor 17 and energizing the light 171. Opening the pressure switch 97 closes its corresponding switch 186 which energizes the warning pressure light 190. The latching coil 188 will keep the light 190 energized even though the seal pressure rises. Thus, the operator or maintenance man when arriving will know that the seal pressure had been too low. Once the seal pressure has risen above the predetermined minimum, the reset switch 193 can be opened which will deenergized the light 190. The pump motor 17 can, of course, be started once more which will again deenergize the light 171.

Because of the possible serious consequences of having overtemperature conditions for the product being processed by the sandmill, it is desirable to have yet another safety feature. Thus, the temperature responsive switch 194 senses the temperature of the product directly and if an overtemperature condition exists, it will close and energize an audible alarm 196. Thus, the operator will be alerted to this emergency condition. The temperature alarm circuit 146 is not connected to stop the pump motor 17 in that it is usually desirable that the pump continues to operate. An overtemperature condition would normally be aggravated if the flow of cooler product to the vessel were interrupted. An overtemperature condition could be caused by a number of factors, the most obvious one being that the cooling water through the water jacket is not flowing at a sufficient rate or at a sufficiently low enough temperature. In this connection, a flow meter may be introduced to the cooling water line so that an operator can obtain a visual indication as to the rate of flow of the cooling water.

The combination of these various pressure and temperature interlocks for the sandmill are a considerable benefit for safe and reliable operation and provides great assistance in saving maintenance time if a malfunction does occur.

What is claimed is:

1. Apparatus for milling particles in liquids comprising:
   a vessel for containing a grinding media;
   a pump for pumping through said vessel the liquid carrying particles to be milled;
   a rotor in said vessel for agitating the media;
   means for sensing the pressure within the vessel;
   means connected to the sensing means to stop the pump when the sensed pressure is beyond a predetermined range; and
   warning means connected to said sensing means to be energized when the sensed pressure is beyond said range.

2. The apparatus of claim 1 including a cooling jacket for said vessel and means for applying a coolant under pressure through said jacket; means for sensing the coolant pressure and stopping said pump when the sensed coolant pressure is beyond a predetermined range; and warning means connected to said coolant pressure sensing means to be energized when the sensed coolant pressure is beyond said coolant pressure range.

3. The apparatus of claim 1 wherein said rotor includes a drive shaft extending out one end of the vessel; and including a seal in the area where the shaft extends out of the vessel, a closed chamber surrounding the seal, means for applying fluid pressure to the chamber to a level higher than the vessel pressure; means for sensing the fluid pressure in said closed seal chamber, and stopping said pump when the sensed chamber pressure is beyond a predetermined range; and warning means connected to said seal chamber pressure sensing means to be energized when the seal chamber pressure is beyond said seal chamber pressure range.

4. The apparatus of claim 3 wherein said means for sensing the pressure applied to said seal chamber is connected to said pump means in a manner to prevent operation of the pump unless said chamber pressure is above a predetermined minimum pressure.

5. The apparatus of claim 1 wherein said warning means includes a light which when energized advises the operator when said pressure is out of its specified range.

6. The apparatus of claim 5 including latch means for maintaining said light energized even though the pressure sensed is no longer out of range, thereby continuing to advise the operator of the out of range pressure which stopped the motor.

7. The apparatus of claim 1 including means for sensing the temperature within said vessel, and means connected to said temperature sensing means to provide an audible warning when said temperature is beyond a predetermined range, while said pump continues to operate.

8. The apparatus of claim 1 wherein said warning means comprises a light which is energized to indicate that said pump is stopped.

9. The apparatus of claim 1 wherein said warning means indicates that said sensed pressure is beyond its range and also indicates that the pump has stopped.

10. Apparatus for milling particles in liquid comprising:
    a processing vessel with a surrounding cooling jacket;
    a pump for pumping the liquid to be processed through said vessel;
    a rotor in said vessel including a drive shaft extending out one end of the vessel;
    a seal surrounding said shaft in the area where the shaft extends out of the vessel;
    means defining a seal housing surrounding one side of the seal with the other side of the seal being exposed to the pressure within the vessel;
    means for applying fluid pressure to the seal housing to a level higher than the pressure within the vessel and in a manner to urge the seal in a direction to prevent leakage from the vessel;
    an electrical control circuit including switches responsive to the pressure within said vessel, the pressure within said cooling jacket, and the pressure within said seal housing, with said switches being connected to stop said pump when one of the sensed pressures is beyond a predetermined range, and including warning lights which are connected to be energized when any of said sensed pressures is beyond said predetermined range to indicate which parameter is beyond its range.

11. The apparatus of claim 10 wherein said electrical control circuit further includes a light which is to be energized upon the stopping of said pump regardless of which sensed pressure has gone beyond its range, said pump warning light remaining energized until said pump is once more started.

12. The apparatus of claim 10 including means for providing an audible signal responsive to the temperature above a predetermined range within said vessel.

* * * * *